March 19, 1968        I. S. PAYNE        3,374,412
CONTROL SYSTEM FOR REGULATING CURRENT PULSES TO
BATTERY POWERED ELECTRIC MOTORS
Filed April 16, 1965
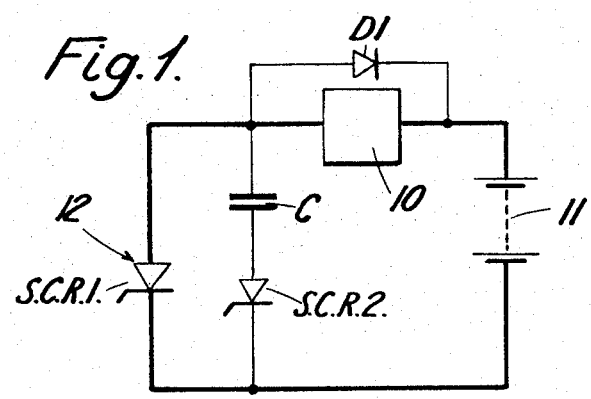
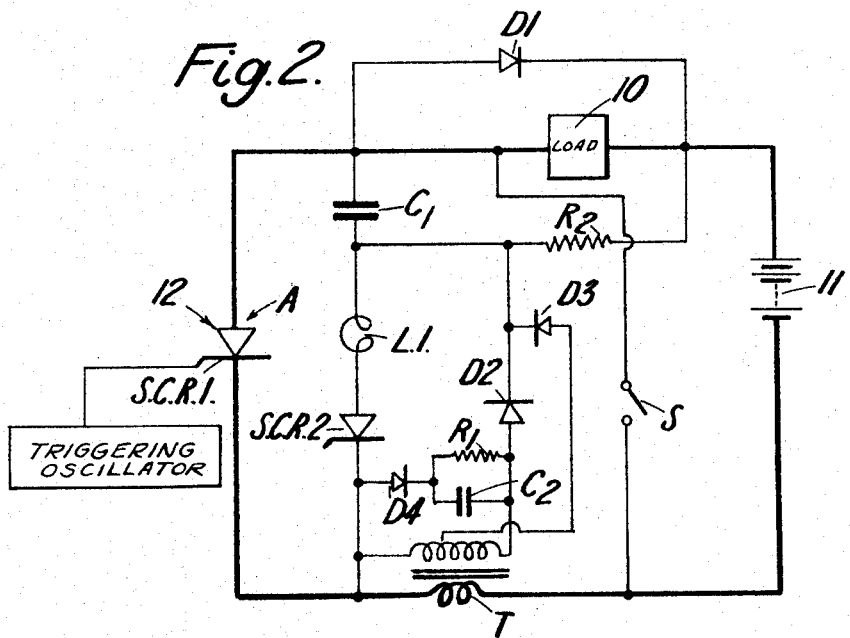

United States Patent Office 3,374,412
Patented Mar. 19, 1968

3,374,412
CONTROL SYSTEM FOR REGULATING CURRENT PULSES TO BATTERY POWERED ELECTRIC MOTORS
Ivan Salisbury Payne, Basingstoke, England, assignor to Lansing Bagnall Limited, Basingstoke, England, a British company
Filed Apr. 16, 1965, Ser. No. 448,621
Claims priority, application Great Britain, Apr. 20, 1964, 16,217/64
1 Claim. (Cl. 318—341)

ABSTRACT OF THE DISCLOSURE

A control system for a battery powered electric motor, which system comprises a circuit containing in series the motor, a battery and a controlled rectifier, means for automatically periodically triggering the rectifier to control the supply of current to the motor in pulses, a capacitor arranged to act on the rectifier to terminate each pulse of current, a transformer having its primary connected in series in the said circuit, a subordinate rectifier circuit connecting the transformer secondary to the capacitor to charge the capacitor as the current of each pulse increases, a parallel circuit around the motor for partly charging the capacitor and containing said capacitor and a resistor and a parallel circuit shorting said controlled rectifier and said transformer primary and containing an on-off switch, the motor and the battery.

---

This invention relates to control systems for electric motors and has a particularly useful but not exclusive application in relation to electric motors for driving industrial trucks, which motors are powered by batteries or fuel cells and use heavy currents at low voltage.

According to this invention there is provided a control system for an electric motor, which control system comprises means for supplying current-pulses to the motor, and regulating means for varying the time interval between pulses and/or the length of each pulse, said regulating means including controlled rectifier means which is automatically triggered to supply current to the motor, a capacitor adapted and arranged to act on the rectifier means to stop the flow of current after an interval, and a transformer arranged to charge said capacitor. Conveniently the primary windings of the transformer are connected in circuit with the same current source as that with which the motor is connected.

According to a feature of the invention the primary windings of the transformer are connected in series with the controlled rectifier means.

One embodiment of the invention will now be described by way of example. The description makes reference to the accompanying drawings, in which:

FIGURE 1 shows the general circuit diagram of a known system for pulse control of a motor from a D.C. source of supply, and FIGURE 2 shows one way in which the circuit of FIGURE 1 can be modified so as to embody the present invention.

Referring first to the circuit shown in FIGURE 1, pulses of current are fed to a load 10, which in this instance is constituted by the field and armature windings of a D.C. motor, from a battery 11 through regulating means 12. The regulating means comprises a controlled rectifier SCR 1 in the form of a thyristor connected between the load 10 and battery 11, and a capacitor C and thyristor SCR2 arranged in parallel with thyristor SCR 1.

Trigger circuits of known kind for firing the thyristors SCR 1 and SCR 2 are provided but are not shown. When the main thyristor SCR 1 is fired, current commences to pass through load 10 and capacitor C is charged to approximately the supply voltage, for example through a resistance (not shown) from the positive terminal of battery 11 or through a resonant inductive circuit (not shown). When thyristor SCR 2 is fired, capacitor C is discharged through thyristors SCR 2 and SCR 1 and terminates the flow of current through thyristor SCR 1 from the battery to the load. A diode D1 is connected in parallel with the load and serves to prevent the occurrence of an excessive inductive voltage across thyristor SCR 1 at the moment of turn-off and to provide a means of carrying the inductive energy in the load during the "off" period. SCR 1 is then fired again automatically, and the cycle is continuously repeated to provide a pulsing energising current for the motor.

In order that the capacitor discharge current may be sufficient to exceed the forward load current through thyristor SCR 1 under heavy overload conditions, capacitor C must have a large value. In one example in which the above arrangement was employed to control a 3 H.P. 45 volt D.C. motor, a capacitor of 350 microfarad capacity was found to be necessary in order to enable the system to deal with overload currents of the order of 400 amps.

Referring now to FIGURE 2 of the drawings, the previously described arrangement is modified in accordance with the present invention by the inclusion of a transformer T of which the primary windings are connected in circuit with the regulating means 12 and of which the secondary windings are connected in series with a diode D2 across thyristor SCR 2. In addition, a diode D4, resistance R1 and capacitor C2 are disposed as shown across the secondary windings of transformer T.

The circuit comprising diode D4, resistance R1 and capacitor C2 is provided to dissipate the reverse voltage induced in the secondary windings of the transformer by the interruption of the load current at the end of each current pulse.

When thyristor SCR 1 is fired, the rising load current induces a voltage in the secondary windings of the transformer which voltage charges capacitor C1 (corresponding to capacitor C in the previously described arrangement) through diode D2 to a voltage predetermined by the core size and turns ratio of transformer T, by the rate of rise of the load current and by the length of the current pulse.

In order to achieve this result, the transformer T should be so wound that it operates with a normal degree of magnetisation of the core (i.e. the core is unsaturated) so that the rate of increase of the magnetic field bears a substantially linear relation to the rate of rise of current in the circuit to the load 10, when the thyristor SCR 1 is fired, and therefore the charging rate for capacitor C, will also bear a linear relationship to the rise of current at the onset of each pulse. When thyristor SCR 2 is fired, capacitor C1 is discharged through thyristors SCR 2 and SCR 1 to turn off thyristor SCR 1 and thus terminate the pulse of current to load 10. As in the previously described arrangement, thyristor SCR 1 is fired again and thyristor SCR 2 is turned off cyclically to provide a pulsing current supply to the load.

In order to control a 3 H.P. 45 volt D.C. motor under the overload conditions previously described, it was found convenient to charge capacitor C1 to 125 volts which enables a capacitor having a capacity of only 65 microfarads to be used in contrast to 350 microfarads in the circuit of FIGURE 1. It will thus be seen that the arrangement just described enables the capacity of the turn-off capacitor C1 to be substantially reduced for a given current handling capacity by comparison with the arrangement of FIGURE 1. The arrangement of FIGURE 2 avoids the use of inductive effect to obtain a sufficiently high voltage on capacitor C1.

It may be necessary or desirable to include an inductance L1 in the position shown in FIGURE 2 to provide a discharge pulse of sufficient length to turn off thyristor SCR 1 when thyristor 2 is fired. In addition it may be desirable to include a high resistance R2 as shown and/or a diode D3 connected to a tapping on the transformer secondary windings to assist in discharging the reverse charge on capacitor C1 at the end of each pulse and in recharging capacitor C1 up to battery voltage in the correct sense under some conditions.

In an oscillator which controls thyristor SCR 1 it is desirable to include means for ensuring that the thyristor SCR 1 cannot be fired unless the voltage at point A in the circuit is sufficiently low to ensure that the resulting rate of current increase will be high enough to induce an adequate voltage charge on capacitor C1 and hence to ensure that capacitor C1 will not fail to turn off thyristor SCR 1 when thyristor SCR 2 is fired.

A switch S may be connected across the load and battery as shown in FIGURE 2 to short-circuit the pulse control system and to supply current direct from the battery to the load when a sufficiently high on/off time-ratio has been attained. In this case the primary windings of the transformer should be arranged as shown in such a position in the circuit that the diversion of load current from the switch to thyristor SCR 1 when switch S is re-opened will effectively charge capacitor C1.

I claim:
1. A control system for a battery powered electric motor, which system comprises a circuit containing in series the motor, a battery and a controlled rectifier, means for automatically periodically triggering the rectifier to control the supply of current to the motor in pulses, a capacitor arranged to act on the rectifier to terminate each pulse of current, a transformer having its primary connected in series in the said circuit, a subordinate rectifier circuit connecting the transformer secondary to the capacitor to charge the capacitor as the current of each pulse increases, a parallel circuit around the motor for partly charging the capacitor and containing said capacitor and a resistor and a parallel circuit shorting said controlled rectifier and said transformer primary and containing an on-off switch, the motor and the battery.

References Cited

UNITED STATES PATENTS 3,150,307 9/1964 Kaeding _____ 318—345
3,222,582 12/1965 Heyman et al. ____ 318—345 X ORIS L. RADER, *Primary Examiner.*

J. J. BAKER, *Assistant Examiner.*